United States Patent Office

2,701,805
Patented Feb. 8, 1955

2,701,805

PROCESS FOR THE PRODUCTION OF 3-KETO-BISNOR-4-CHOLEN-22-AL

Douglas A. Shepherd and Raymond L. Pederson, Kalamazoo, Mich., assignors to The Upjohn Company, Kalamazoo, Mich., a corporation of Michigan No Drawing. Application June 14, 1952,
Serial No. 293,644

3 Claims. (Cl. 260—397.3)

The present invention relates to a novel and useful chemical process for the preparation of 3-keto-bisnor-4-cholen-22-al.

It is an object of this invention to provide a novel and useful process for the production of 3-keto-bisnor-4-cholenaldehyde, a compound which is very useful because of its ready convertibility to the physiologically active steroid hormone progesterone by known procedure [Heyl and Herr, J. Am. Chem. Soc., 72, 2617 (1950); Heyl and Herr, copending application Serial Number 111,098, filed August 18, 1949, now Patent 2,601,287]. Other objects and uses of this invention will be apparent to those skilled in the art to which this invention pertains.

Conversion of stigmastadienone to 3-keto-bisnor-4-cholen-22-al by an ozonization process is known in the art, the maximum yield being 72 per cent of the theoretical amount [Heyl and Herr, J. Am. Chem. Soc., 72, 2617 (1950); Heyl and Herr, copending application Serial Number 111,098, filed August 18, 1949, now Patent 2,601,287]. In contrast, the novel process of the present invention, a simple and highly selective ozonization of 4,22-ergostadien-3-one, provides 3-keto-bisnor-4-cholen-22-al of high purity in yields greater than ninety per cent of the theoretical amount. As a result the process of the present invention is of considerable economic and commercial significance, especially since whatever starting material is chosen for the preparation of 3-keto-bisnor-4-cholen-22-al, it is still sufficiently costly to render the attainable yield of desired aldehyde of prime importance.

According to the process of the present invention, ozone is added, with great selectivity, to the 22-double bond of 4,22-ergostadien-3-one, the four-double bond being unaffected, and the resulting ozonide is decomposed under reducing conditions to obtain 3-keto-bisnor-4-cholenaldehyde, the yield ordinarily being nearly the theoretical amount. The 4,22-ergostadien-3-one is obtained, in high yield, by selective hydrogenation of the six-double bond in 4,6,22-ergostatrien-3-one, using between about 0.9 and about 1.2 moles of hydrogen per mole of the 4,6,22-ergostatrien-3-one, in the presence of a palladium catalyst. The combination of these two steps, the hydrogenation and the ozonolysis steps, is of considerable significance, since the hydrogenation step gives sufficiently high yields of the desired 4,22-ergostadien-3-one that the ozonolysis step can be carried out directly without separation of the starting 4,22-ergostadien-3-one, if desired.

In carrying out the process of the present invention 4,22-ergostadien-3-one is dissolved in an organic solvent, such as, for example, chloroform, carbon tetrachloride, methylene chloride, ether, methanol, ethyl acetate, acetic acid, and the like, or mixtures thereof, with methylene chloride usually being preferred, the concept, definition, and use of a solvent being well known in the art. It is usually preferred to add a small quantity of an acid-binding agent, such as, for example, a tertiary amine, illustratively pyridine, triethylamine, picoline, N-methyl piperidine, or the like, to neutralize any acid which may be formed during the reaction. The amount of amine, for example pyridine, when added, is normally between about 0.1 and about two per cent, or more, of the weight of the solvent. Ozone is then introduced into the solution of 4,22-ergostadien-3-one by any convenient method, such as, for example, by passing an ozone-air or ozone-oxygen mixture into the solution, preferably with stirring. The amount of ozone used is usually between about one mole and about 1.5 moles per mole of 4,22-ergostadien-3-one. An excess over the amount necessary to form the 22(23)-mono-ozonide, between about one mole and about 1.25 moles per mole of 4,22-ergostadien-3-one, is usually required to make allowance for losses of ozone, such as, for example, reaction of the ozone with the solvent. The ozonization is carried out at a temperature below about plus thirty degrees centigrade, and preferably between about a minus eighty and about a minus thirty degrees centigrade. It is preferred not to isolate the 4,22-ergostadien-3-one 22(23)-mono-ozonide. However, the ozonide may be isolated, if desired, by simple procedure, such as, for example, distillation of the ozonide solution, the residue being the 4,22-ergostadien-3-one 22(23)-mono-ozonide.

After completion of the ozonization reaction, the resulting 4,22-ergostadien-3-one 22(23)-mono-ozonide is reductively decomposed, i. e., the 22(23)-mono-ozonide is decomposed under reducing conditions. The use of reducing conditions for the decomposition of ozonides is well-known in the art [Hill and Kelly, "Organic Chemistry," page 53, the Blackiston Company, Philadelphia (1934); Church et al., J. Am. Chem. Soc., 56, 176 (1934); Gilman "Organic Chemistry," second edition, page 636, John Wiley and Sons, New York (1943); Long, Chem. Reviews, 27, 452–454 (1940)]. For example, the preferred procedure involves treating the ozonide with a metal, suitably zinc dust, and an acid, suitably acetic acid. Usually the cold 22(23)-mono-ozonide solution is admixed with zinc dust and acetic acid, the addition being in any order, and then the temperature is adjusted, if necessary, to carry out the reductive decomposition. The temperature for decomposition is preferably between about zero and about forty degrees centigrade, although higher and lower temperatures may be used. Normally the reaction mixture is stirred at a temperature between about zero and about ten degrees centigrade for a period of about one hour and then stirred at a temperature of about 35 degrees centigrade for about five minutes; however, the periods of stirring may be shorter or longer and the temperatures may be higher or lower. Usually the solvent used in the ozonization reaction is used as the solvent in the reductive decomposition reaction; however, the solvent, if other than acetic acid, may be replaced by acetic acid, if desired, by diluting the mono-ozonide solution with acetic acid and subsequently fractionally distilling to remove the ozonization reaction solvent and obtain a solution of the mono-ozonide dissolved in acetic acid.

The crude 3-keto-bisnor-4-cholen-22-al may be isolated, if desired, by suitable procedure, such as, for example, filtration to remove unreacted zinc and distillation of the solvent. It usually is preferred to purify the crude product without isolation and then isolate the purified 3-keto-bisnor-4-cholen-22-al. This may be accomplished by suitable procedure, such as, for example, when the solvent is methylene chloride, removing the unreacted zinc by filtration, washing the resulting filtrate successively with ice-water, iced basic solutions, such as, for example, ten per cent sodium carbonate solution, ten per cent sodium hydroxide solution, or the like, and again with ice-water, and then drying the washed solution over a drying agent, suitably anhydrous sodium sulfate. The drying agent is removed by filtration, the resultant filtrate diluted with an alcohol, suitably isopropanol, the diluted filtrate concentrated in vacuo, and the product allowed to crystallize from the resulting concentrate, whereafter the purified 3-keto-bisnor-4-cholen-22-al is removed by filtration. A second crop of purified product is obtained by further concentration of the remaining filtrate, the total yield of high purity 3 - keto - bisnor - 4 - cholen - 22 - al ordinarily being greater than ninety per cent of the theoretical amount. Crude preparations of 4,22-ergostadien-3-one, such as obtained without isolation from the previous hydrogenation step in the reaction sequence given herein, may also be converted to 3-keto-bisnor-4-cholen-22-al in high yields by the method of the present invention, the yield being calculated on a basis of the 4,22-ergostadien-3-one present in the starting material.

In preparing 4,22-ergostadien-3-one, a palladium catalyst is admixed with a solvent, such as, for example, ethyl acetate, methyl alcohol, dioxane, and the like. It is preferred to include in the admixture a small amount of a base, such as, for example, an alkali-metal hydroxide, preferably sodium or potassium hydroxide, preferably between about 0.1 gram and about one gram per liter of solvent. If a base is used, methanol or a methanol-dioxane mixture is the preferred solvent. If a base is not included, ethyl acetate is the preferred solvent. Normally anhydrous solvents are used; however, the presence of moderate amounts of water usually does not lower the yield of product. The preferred catalyst is a palladium-charcoal catalyst. However, other palladium catalysts, such as, for example, palladium-barium sulfate, palladium-cadmium oxide, palladium-barium carbonate, palladium-zinc carbonate, and others, are suitable. Ordinarily a five per cent palladium-charcoal catalyst is used; however, a palladium-charcoal catalyst containing 0.1 per cent palladium, or even less, or ten per cent palladium, or even more, also gives excellent results.

The palladium catalyst is usually prereduced by agitating the admixture of catalyst and solvent, with or without added base, with hydrogen until hydrogen ceases to react. The resulting admixture containing the prereduced catalyst then is admixed with 4,6,22-ergostatrien-3-one, which is ordinarily previously admixed with a solvent, usually the same solvent as present in the catalyst admixture. Hydrogen then is introduced, with agitation, until between about 0.9 and about 1.2 moles of hydrogen per mole of 4,6,22-ergostatrien-3-one has reacted, the selective hydrogenation being very rapid. The reduction is usually carried out at a temperature between about zero and about 100 degrees centigrade, but higher and lower temperatures are also operative, room temperature being satisfactory and preferred in most instances. The hydrogen is usually introduced at an absolute pressure of between about one and about 1.5 atmospheres, i. e., at a pressure between about equal to and about 0.5 atmosphere above standard pressure; but, lower pressures and considerably higher pressures may be employed. Agitation may be by shaking, stirring, or other conventional agitation procedure.

After the reaction is complete, the crude 4,22-ergostadien-3-one may be isolated by simple procedure, such as, for example, filtration to remove the catalyst, acidification of the resulting filtrate with acid, illustratively acetic acid, if base was used in the reaction, followed by filtration of the acidified solution to remove any insoluble salt formed on acidification, and distillation of the solvent from the resulting filtrate to obtain the isolated crude product.

The pure 4,22-ergostadien-3-one is obtained in high yield from the isolated crude product, if desired, by simple procedure, such as, for example, recrystallization from a suitable solvent. If the 4,22-ergostadien-3-one is to be used in a subsequent reaction, it is sometimes preferred not to isolate or purify the product since it is frequently of sufficient purity to be used as starting material for the subsequent reaction.

The following example is illustrative of a preferred embodiment of the novel process of the present invention, but is not to be construed as limiting.

Example.—3-keto-bisnor-4-cholen-22-al 4,22-ergostadien-3-one is prepared by the following highly selective hydrogenation method: A solution of 1.4 grams of potassium hydroxide (reagent grade, 85%) in two liters of anhydrous methanol is admixed with a slurry of two grams of unreduced five per cent palladium-charcoal catalyst suspended in 800 milliliters of anhydrous methanol in a 2.5-gallon cylindrical bottle. With vigorous stirring hydrogen is introduced at one to 1.5 atmospheres pressure to reduce the catalyst. Then a warm solution of 25.0 grams of 4,6,22-ergostatrien-3-one [Wetter and Dimroth, Ber., 70, 1665 (1937)], melting point 107–109 degrees centigrade, dissolved in 950 milliliters of methanol is added. One to 1.1 mole equivalents of hydrogen is introduced into the resulting admixture at about one to 1.5 atmospheres pressure using vigorous stirring, the reaction being very rapid. When the selective hydrogenation reaction is complete, the catalyst is removed by filtration, the filtrate acidified with two milliliters of acetic acid, and the solvent distilled under reduced pressure. The resulting solid residue, almost the theoretical amount, containing 85 per cent of the desired 4,22-ergostadien-3-one and only a trace of the starting 4,6,22-ergostatrien-3-one as determined by ultraviolet light absorption analysis, is extracted with 135 milliliters of hot ethyl acetate. The insoluble potassium acetate is removed by filtration, the filtrate is allowed to cool at room temperature, and is finally refrigerated. The crystalline product which precipitates from the filtrate is removed by filtration and recrystallized twice from thirty-milliliter portions of ethyl acetate. The yield of pure 4,22-ergostadien-3-one, melting at 128–132 degrees centigrade, $[\alpha]_D^{24} = +43$ degrees in chloroform, is 17.5 grams or 70 per cent of the theoretical amount. The infrared light absorption spectrum is consistent with the assigned structure of the product, showing the presence of a conjugated keto-mono-olefin group and the absence of a hydroxyl group.

Analysis.—Per cent calculated for $C_{28}H_{44}O$: C, 84.79; H, 11.17. Found: C, 85.04; H, 11.04.

The 4,22-ergostadien-3-one is converted to 3-keto-bisnor-4-cholen-22-al by the following highly selective ozonization method: Twenty-one grams (0.053 mole) of 4,22-ergostadien-3-one, from the above reaction, is dissolved in a mixture of 950 milliliters of methylene chloride and six milliliters of pyridine, contained in an 880-milliliter glass reaction flask shaped in a manner similar to a Kjeldahl flask, equipped with a magnetic type mechanical stirrer and cooled in a Dry-Ice-acetone bath (the methylene chloride volume contracts about ten per cent on cooling from about room temperature to about minus seventy degrees centigrade). A 25 kilovolt ozonizer is operated at ninety volts with an oxygen flow of 300 milliliters per minute to produce 0.428 millimoles of ozone per minute. The ozone-oxygen mixture is introduced into the solution of the 4,22-ergostadien-3-one by a sintered glass sparger reaching nearly to the bottom of the reaction flask. The reaction mixture begins to develop a deep orange color a few minutes after the ozone addition is begun. This color changes to a red-brown, and the reaction mixture remains this color until about 148 minutes after the ozone addition is begun. The red-brown color then fades rapidly, and the reaction mixture becomes almost colorless after another fifteen minutes. The ozone addition is then discontinued, the amount of ozone introduced for the selective ozonization being 1.32 moles of ozone per mole of 4,22-ergostadien-3-one.

For reductive decomposition the mono-ozonide solution obtained above is poured immediately into a two-liter, three-necked, round-bottomed flask fitted with a mechanical stirrer and containing 25 grams of zinc dust. Then, with stirring, 111 milliliters of glacial acetic acid is added in one portion, and the temperature of the resulting admixture is raised to between about zero and about ten degrees centigrade by means of a warm water bath. After stirring for a period of about one hour at this temperature, the temperature is raised to about 35 degrees centigrade and stirring is continued for an additional period of about five minutes.

The 3-keto-bisnor-4-cholen-22-al is isolated and purified by the following procedure. The zinc dust is removed by filtration using a sintered glass funnel, and the resulting filtrate is washed successively with the following wash solutions: one liter of ice-water in two equal portions, 75 milliliters of iced ten per cent aqueous sodium carbonate solution, fifty milliliters of iced ten per cent aqueous sodium carbonate solution, 25 milliliters of iced ten per cent sodium hydroxide solution, and 1.2 liters of ice-water in four equal portions. The wash solutions, after use, are fractionally backwashed twice with 75-milliliter portions of methylene chloride. All the resulting methylene chloride solutions are combined and dried by adding fifty grams of anhydrous sodium sulfate and storing for about twelve hours in a refrigerator. The sodium sulfate drying agent then is removed by filtration, using a sintered glass funnel, the filtrate diluted with 100 milliliters of isopropanol, and the diluted filtrate concentrated, in vacuo at a temperature of about forty degrees centigrade, to a volume of about 125 milliliters. In succession the concentrated filtrate is warmed to obtain complete solution, allowed to cool at room temperature, seeded, and finally cooled in a refrigerator to complete precipitation. On filtration the first crop of 3-keto-bisnor-4-cholen-22-al is obtained as needles; melting point 154 to 156 degrees centigrade; $[\alpha]_D^{24}$ plus 84 degrees in chloroform; yield 14.6 grams or 84 per cent of the theoretical amount. Concentration of the filtrate to about sixty milliliters, followed by warming, cooling, seeding, and refrigeration, in the same manner as described above to obtain the first crop, gives a second crop of 3-ketobisnor-4-cholen-22-al as fine needles; melting point 152 to 154 degrees centigrade; $[\alpha]_D^{24}$ plus eighty degrees in chloroform; yield 1.5 grams or nine per cent of the theoretical amount. The total yield of pure 3-keto-bisnor-4-cholen-22-al is sixteen grams or 93 per cent of the theoretical amount based on the amount of starting 4,22-ergostadien-3-one.

By the above procedure a 41.7 gram bath of 4,22-ergostadien-3-one, divided into two equal portions, is converted into a total of 32 grams of 3-keto-bisnor-4-cholen-22-al, the total yield being 93 percent of the theoretical amount based on the amount of starting 4,22-ergostadien-3-one.

The following modification of the last part of the above isolation and purification procedure also gives high recovery. The combined methylene chloride solutions, after drying and removal of the drying agent as described above, are evaporated to dryness in vacuo at about forty degrees centigrade. The residue is cooled in vacuo and 25 milliliters of cold ethyl ether is sucked into the flask. The solid residue is triturated with the ether, filtered, and washed with five milliliters of cold ether to obtain the first crop of 3-keto-bisnor-4-cholen-22-al; melting point 154 to 156 degrees centigrade; $[\alpha]_D^{24}$ plus 83 degrees in chloroform; yield 15.2 grams or 88 per cent of the theoretical amount. A second crop is obtained from the remaining ether wash liquids by distilling the ether in vacuo, triturating the solid residue with ten milliliters of isopropanol, and filtering. The second crop of 3-keto-bisnor-4-cholen-22-al weighs one gram or five per cent of the theoretical amount; melting point 156 to 158 degrees centigrade; $[\alpha]_D^{24}$ plus 81 degrees in chloroform. The total recovery of pure 3-keto-bisnor-4-cholen-22-al by this modified procedure is sixteen grams or 93 per cent of the theoretical amount, starting with 21 grams of 4,22-ergostadien-3-one.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A process for the production of 3-keto-bisnor-4-cholen-22-al which includes the steps of selectively reducing, with between about 0.9 and about 1.2 moles of hydrogen, in the presence of a palladium catalyst, the six-double bond of 4,6,22-ergostatrien-3-one, without concurrently reducing the four and 22-double bonds and the three-keto group thereof, to produce 4,22-ergostadien-3-one; selectively ozonizing the 22-double bond of 4,22-ergostadien-3-one without concurrently ozonizing the four-double bond thereof, with between about one and about 1.5 moles of ozone per mole of 4,22-ergostadien-3-one, to produce 4,22-ergostadien-3-one 22(23)-mono-ozonide, and reductively decomposing the 4,22-ergostadien-3-one 22(23)-mono-ozonide to produce 3-keto-bisnor-4-cholen-22-al.

2. A process for the production of 3-keto-bisnor-4-cholen-22-al which includes the steps of selectively reducing the six-double bond of 4,6,22-ergostatrien-3-one without concurrently reducing the four and 22-double bonds and the three-keto group thereof, by treating 4,6,22-ergostatrien-3-one in an organic solvent with between about 0.9 and about 1.2 moles of hydrogen, in the presence of a palladium-charcoal catalyst, to obtain 4,22-ergostadien-3-one; selectively ozonizing the 22-double bond in 4,22-ergostadien-3-one without concurrently ozonizing the four-double bond, by treating 4,22-ergostadien-3-one, with between about one and about 1.5 moles of ozone per mole of 4,22-ergostadien-3-one, in the presence of an organic solvent, at a temperature between about minus eighty and about plus thirty degrees centigrade to produce 4,22-ergostadien-3-one 22(23)-mono-ozonide; reductively decomposing the 4,22-ergostadien-3-one 22(23)-mono-ozonide with zinc and acetic acid, and isolating the 3-keto-bisnor-4-cholen-22-al thus produced.

3. A process for the production of 3-keto-bisnor-4-cholen-22-al which includes the steps of selectively reducing the six-double bond of 4,6,22-ergostatrien-3-one without concurrently reducing the four and 22-double bonds and the three-keto group thereof, by treating 4,6,22-ergostatrien-3-one in an organic solvent containing a base with between about 0.9 and about 1.2 moles of hydrogen, in the presence of a palladium-charcoal catalyst, to obtain 4,22-ergostadien-3-one; selectively ozonizing the 22-double bond in 4,22-ergostadien-3-one without concurrently ozonizing the four-double bond, by treating 4,22-ergostadien-3-one, with between about one and about 1.5 moles of ozone per mole of 4,22-ergostadien-3-one, in the presence of an organic solvent and an acid binding agent at a temperature between about minus eighty and about minus thirty degrees centigrade to produce 4,22-ergostadien-3-one 22(23)-mono-ozonide; reductively decomprosing the 4,22-ergostadien-3-one 22(23)-mono-ozonide with zinc and acetic acid, and isolating the 3-keto-bisnor-4-cholen-22-al thus produced.

References Cited in the file of this patent

UNITED STATES PATENTS 2,601,287    Heyl ------------------ June 24, 1952